H. H. DAMMAN.
TRACTOR ATTACHMENT FOR VEHICLES.
APPLICATION FILED JUNE 10, 1916.

1,251,344.

Patented Dec. 25, 1917.
2 SHEETS—SHEET 1.

WITNESS
O. Johnson

INVENTOR
Harold H. Damman
BY
C. D. Haskins
ATTORNEY

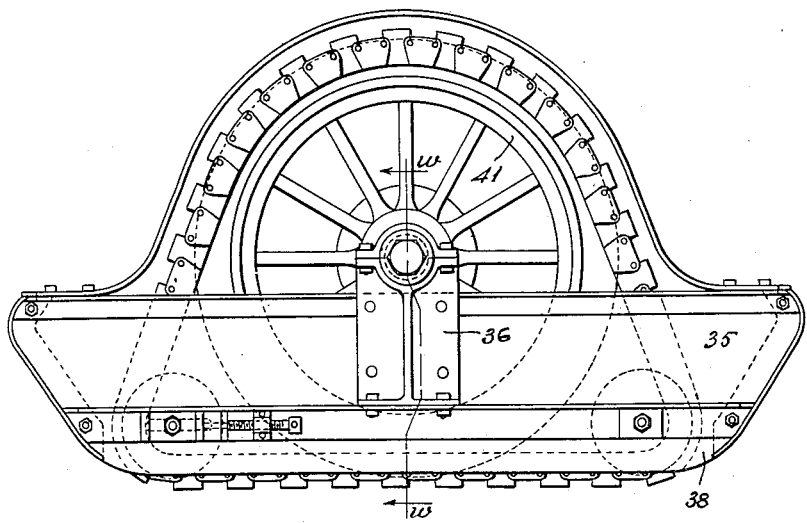
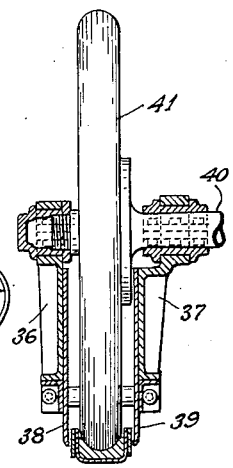
FIG. 3
FIG. 4
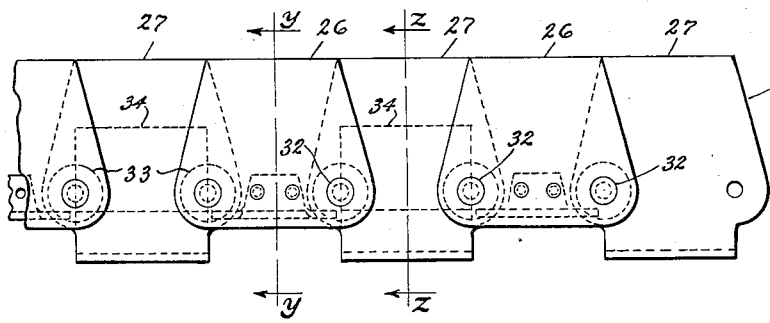
FIG. 5
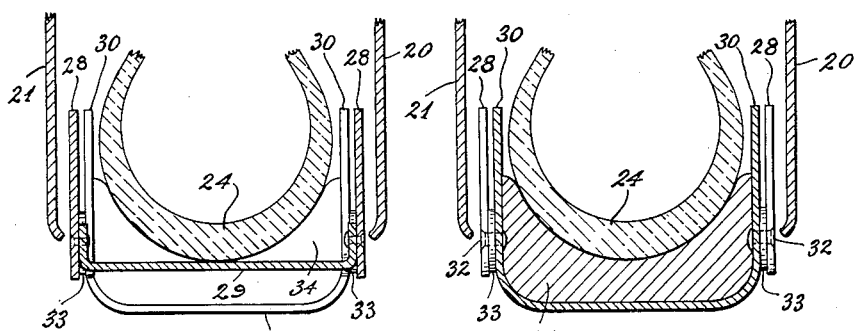
FIG. 6
FIG. 7

UNITED STATES PATENT OFFICE.

HAROLD H. DAMMAN, OF SEATTLE, WASHINGTON.

TRACTOR ATTACHMENT FOR VEHICLES.

1,251,344.  Specification of Letters Patent. Patented Dec. 25, 1917.

Application filed June 10, 1916. Serial No. 103,351.

*To all whom it may concern:*

Be it known that I, HAROLD H. DAMMAN, a citizen of the United States, residing at Seattle, in the county of King and State of Washington, have invented a certain new and useful Improvement in Tractor Attachments for Vehicles, of which the following is a specification.

My invention relates to improvements in detachable tractors for motor vehicles, and the object of my invention is to provide a tractor which shall be adapted to be detachably associated with the rearward wheels and axle of a motor vehicle whereby said motor vehicle may be converted to a tractor of the caterpillar type thus to adapt said motor vehicle to travel more easily over soft or sandy ground and on roads covered with snow or ice.

Figure 1:
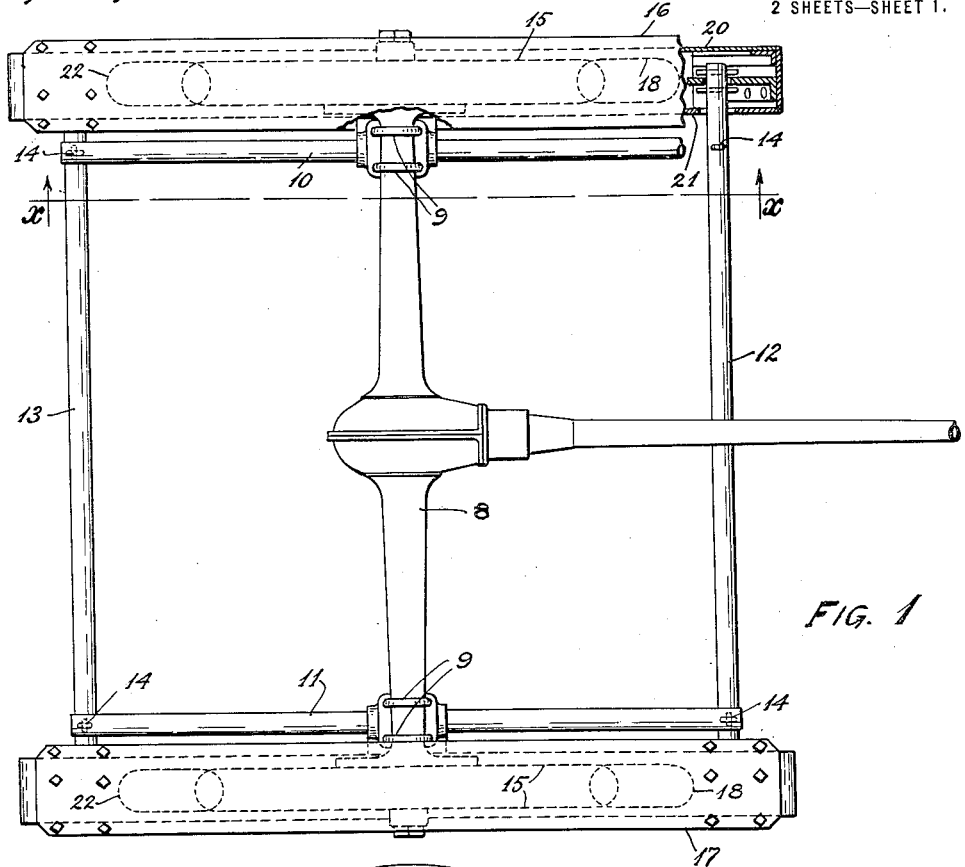
Figure 2:
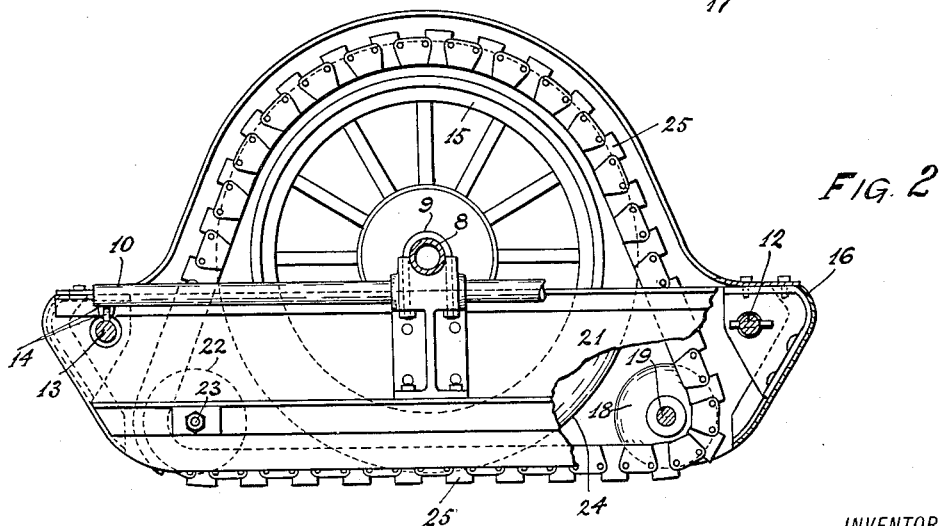

I accomplish this object by devices illustrated in the accompanying drawings wherein Figure 1 is a plan view of one form of the rearward truck of a motor vehicle to which one form of my invention is removably attached; Fig. 2 is a view of the same in vertical section on broken line $x$, $x$ of Fig. 1; Fig. 3 is a view in side elevation of a modified form of some of the associated parts of my invention; Fig. 4 is a sectional view of the same on broken line $w$, $w$ of Fig. 3; Fig. 5 is an enlarged view in side elevation of a fragment of an endless chain embodied in my invention; Fig. 6 is a cross-sectional view on a larger scale, of said chain on broken line $y$, $y$ of Fig. 5; and Fig. 7 is a cross-sectional view of said chain on broken line $z$, $z$, on the same larger scale.

Referring to the drawings, throughout which like reference numerals designate like parts, 8 is the fixed shaft-housing of the rear axle of the motor vehicle, from which shaft-housing 8 is freely suspended, by means of U-shaped bolts 9, the oppositely disposed side rails 10 and 11 of a rectangular frame, whose forward end rail 12 and rearward end rail 13 are connected to the under side of the end portions of the side rails 10 and 11 by links 14, as shown more clearly in Figs. 1 and 2.

The side rails 10 and 11 are disposed each to extend adjacent to the inner side of a different one of the oppositely disposed vehicle wheels 15, which wheels 15 in Fig. 1, are indicated by broken lines, and in Fig. 2 one of them is shown partly in full lines.

Each of the end rails 12 and 13 are sufficiently longer than the distance between the side rails 10 and 11 to project their respective opposite end portions beyond said side rails 10 and 11 to points near the vertical planes of the outer sides of the oppositely disposed vehicle wheels 15, and freely mounted on the end portions of the end rails 12 and 13 adjacent to the side rail 10 is a wheel-inclosing case 16, and a similar wheel-inclosing case 17 is freely mounted on the other end portions of the end rails 12 and 13 at a point adjacent to the side rail 11, as more clearly shown in Fig. 1.

Both of the wheel-inclosing cases 16 and 17 and their associated mechanisms being exactly alike in construction and mode of operation, I will describe only the wheel-inclosing case 16 and its associated devices, which are more clearly shown in Figs. 1 and 2.

Within said wheel-inclosing case 16, in the bottom portion near its front end, is an idler pulley 18 rotatably mounted on a shaft 19 which is fixed in the side walls 20 and 21 of said wheel-inclosing case 16 to extend therebetween, and in the bottom portion near the rearward end thereof is a similar idler pulley 22 (indicated by circular dotted lines) that is rotatably mounted on a shaft 23 that extends between said side walls 20 and 21 to which said shaft 23 is adjustably secured to adapt it to be moved forwardly or backwardly to different desired points of adjustment with respect to its distance from the shaft 19.

The wheel 15 is provided with a pneumatic tire 24, of well known form, and the peripheries of the pulleys 18 and 22 are both of a form that corresponds with the contour of the periphery of the tire 24; and operatively mounted on the peripheries of the tire 24 and the pulleys 18 and 22 is an endless chain belt 25, of the form shown more clearly in Figs. 5, 6 and 7, which endless chain belt 25 may be adjusted with respect to its tension by moving the shaft 23 rearwardly or forwardly to a required point where it may be fastened by a nut.

That portion of the chain belt 25 that extends directly between the pulleys 18 and 22 is disposed to adapt it to travel in a plane that is lower than the bottom edges of the side walls 20 and 21, thus to project downwardly through an opening formed in the bottom of the wheel-inclosing case 16, and thus disposed the periphery of the tire 24 will rest on said chain belt 25 at a point about midway between the pulleys 18 and 22 thereby to transfer the whole weight carried by the rear axle of the vehicle on to said chain belt 25 which will serve as a tractor.

The endless chain belt 25, as shown in Figs. 5, 6 and 7 embodies two forms of links, as links 26 and 27, which alternate with respect to their relative positions when connected together as shown in Fig. 5.

The cross-sectional form of the links 26 is shown in Fig. 6, while the cross-sectional form of the links 27 is shown in Fig. 7.

Each of the links 26, comprises side plates 28 which are spaced apart and rigidly united by a bottom cross plate 29, to the opposite ends of which cross plate 29 said side plates 28 are riveted.

Each of the links 27, comprises side plates 30 which are spaced apart and rigidly united by an integral bottom plate 31 which extends between the bottom edges of said oppositely disposed side plates 30.

The side plates 30 of each of the links 27 are spaced apart for a distance sufficient to span the tire 24, and the side plates 28 of each of the links 26 are spaced apart for a distance sufficient to span the oppositely disposed side plates 30 of the links 27.

Each of the opposite end portions of each of the links 26 are articulated by rivets, as rivets 32, to the adjacent end portion of the adjacent link 27, said rivets 32 extending through washers 33 disposed between the side plates 28 and 30.

Securely fastened within each of the links 27 to engage with the inner side surfaces of its side plates 30 and its bottom plate 31 is a block 34, preferably of light non-metalic material, as, for instance, wood, which block 34 is provided with a concave surface on its upper side of a form corresponding with the contour of the tire 24, whereby such block 34 may be adapted evenly to engage with the surface of the periphery of said tire 24 and the peripheries of the pulleys 18 and 22 as the chain belt 25 travels in its course around said tire and said pulleys.

Each of the links 27 projects its bottom plate 31 downwardly from the rivets 32 to a lower plane than the plane of the bottom plates 29 of the links 26 so that only said links 27 may engage with the surface of a roadway to sustain the weight of the vehicle.

My detachable tractor, when disposed in association with the rearward wheels of a motor vehicle, will serve to distribute the weight carried by the rearward axle of said vehicle over a large area of ground and the links 27 of the traction chain 25 will engage with the surface of the roadway in such manner that there can be no slipping effect on ice or snow.

To detach that form of my tractor, which is shown in Figs. 1 and 2, from a vehicle to which it is attached it is only necessary to raise the rear axle of the vehicle from the ground, then take off the top covers of the wheel-inclosing cases 16 and 17, then disconnect adjacent ones of the links 26 and 27 and remove the chain 25, then remove the U shaped bolts 9, whereupon the wheel-inclosing cases 16 and 17 with their attached supporting frame will fall to the ground to be withdrawn from beneath the vehicle.

The operation of again attaching the tractor to the vehicle is obvious and needs no description.

In Figs. 3 and 4, I have illustrated a modified form of a structure which differs in plan of construction only with respect to means of attaching the wheel-inclosing cases, as the wheel-inclosing case 35, to the fixed shaft-housing 8 of Fig. 1, which wheel-inclosing case 35 corresponds to the wheel-inclosing cases 16 and 17, which modified form makes it possible to dispense with the frame comprising the side rails 10 and 11 and the end rails 12 and 13, thus making both wheel-inclosing cases independently attachable and detachable.

Referring to Figs. 3 and 4, the wheel-inclosing case 35 is provided with brackets 36 and 37 secured respectively to the outer and inner side plates 38 and 39 at opposite points thereof, which brackets 36 and 37 are detachably connected with the axle 40 to be freely suspended therefrom, the bracket 36 being disposed on the outside of the vehicle wheel 41, while the bracket 37 is disposed adjacent to the inner side of said wheel 41, as shown in Fig. 4, which wheel 41 corresponds with the wheel 15 of Figs. 1 and 2.

In all other particulars the construction and mode of operation of the structure of Figs. 3 and 4 is like that of the structure of Figs. 1, 2, 5, 6 and 7.

Obviously, changes may be made in the forms, dimensions and arrangement of parts of my invention without departing from the spirit thereof.

What I claim is:

1. In a detachable tractor of the class described, the combination with a motor vehicle, of wheel-inclosing cases provided with an open bottom and detachably connected to a truck of said vehicle in positions to inclose each of the wheels of said truck; two idler pulleys rotatably mounted within the lower portion of said wheel-inclosing case, one of which pulleys is disposed in the forward end portions and the other in the rearward end portion of said wheel-inclosing case, and one of said pulleys being adjustably movable in forward and backward directions; and an endless chain belt disposed within each of said wheel-inclosing cases and operatively mounted on the peripheries of said pulleys and the periphery of the wheel inclosed by said wheel-inclosing case the adjustable pulley regulating the slack of the endless chain.

2. A detachable tractor of the class described, which embodies two wheel-inclosing cases adapted to be suspended from an axle of a motor vehicle in positions to inclose the two wheels on said axle, each of said wheel-inclosing cases being provided with an opening through its bottom; two pulleys rotatably mounted within the lower portion of each of said wheel-inclosing cases and disposed one in the forward end portion thereof and the other disposed in the rearward portion thereof; and two endless chain belts each adapted to be disposed in a different one of said wheel-inclosing cases to encircle the two pulleys and the wheel therein contained, to operatively engage with the peripheries thereof and to project a portion of its length out of the opening formed in the bottom of said wheel-inclosing case.

3. A device of the class described comprising in combination with the driven supporting wheels of a motor vehicle, an endless chain adapted to inclose said driven wheels, means for causing the ground engaging portion of said chain to travel in a horizontal plane, and an inclosing frame for said chain and wheel running free of the ground.

4. A device of the class described comprising in combination with the driven wheels of a motor vehicle, an endless chain adapted to inclose said driven wheels, means for causing the ground engaging portion of said chain to travel in a horizontal plane, an inclosing frame for said chain and wheel running free of the ground, and means supported by said frame for regulating the slack of the chain.

In witness whereof I hereunto subscribe my name this 29th day of May, A. D. 1916.

HAROLD H. DAMMAN.

Witnesses:
FRANK WARREN,
A. HASKINS.